June 21, 1966  S. C. BELL  3,257,382
PREPARATION OF 1,3-DIHYDRO-5-PHENYL-2H-1,4-BENZODIAZEPIN-2-ONE
4-OXIDE COMPOUNDS
Original Filed Dec. 3, 1963
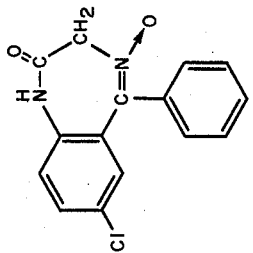
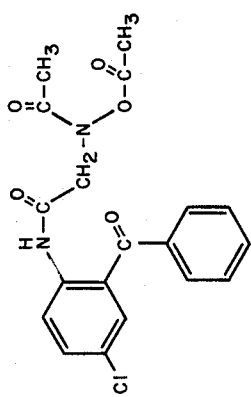
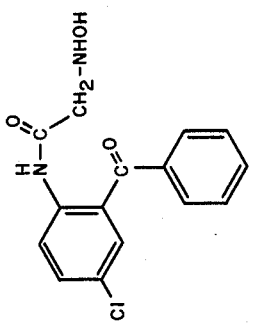
*INVENTOR*
STANLEY C. BELL
BY Vito Victor Bellino
*ATTORNEY*

United States Patent Office 3,257,382
Patented June 21, 1966

---

3,257,382
PREPARATION OF 1,3-DIHYDRO-5-PHENYL-2H-1,4-BENZODIAZEPIN-2-ONE 4-OXIDE COMPOUNDS
Stanley C. Bell, Philadelphia, Pa., assignor to American Home Products Corporation, New York, N.Y., a corporation of Delaware
Original application Dec. 3, 1963, Ser. No. 327,667. Divided and this application Sept. 11, 1964, Ser. No. 402,374
2 Claims. (Cl. 260—239.3)

This application is a division of my prior, co-pending application, Serial No. 327,667 filed December 3, 1963, which is a continuation-in-part of application Serial No. 283,966, filed May 29, 1963, now abandoned.

This invention relates to compositions of matter classified in the art of chemistry as substituted 2-aminophenyl aryl ketones and to processes for making and using them.

The invention sought to be patented in its principal composition aspect, is described as residing in the concept of a chemical compound having a molecular structure in which the 2-acetamido benzophenone nucleus has attached, to the 2-position carbon atom of the acetamido, the N-acetoxyacetamido radical.

The tangible embodiments of the compositions of the invention possess the inherent general physical properties of being relatively high melting, white crystalline solids, are substantially insoluble in water and are soluble in polar solvents, such as lower aliphatic alcohols. Examination of the compounds produced according to the hereinafter described process reveals upon ultraviolet and infrared spectrographic analysis, spectral data confirming the molecular structure hereinbefore set forth. Thus the

linkage and the two

linkages are evident. The aforementioned physical characteristics, taken together with the nature of the starting materials and the mode of synthesis, positively confirm the structure of the compositions sought to be patented.

The tangible embodiments of the invention possess the inherent applied use characteristic of intermediates for the production of valuable 1,3-dihydro-5-phenyl-2H-1,4-benzodiazepin-2-ones disclosed in copending U.S. application Serial No. 87,102 filed February 6, 1961, which have useful properties in that they are valuable for human and medicinal uses having demonstrated activity as anti-convulsants, sedatives, and muscle-relaxants according to standard pharmacological test procedures. Moreover a specific composition of the invention 2-[2-(N-acetoxyacetamido)acetamido]-5-chloro-benzophenone exhibited sedative activity when tested according to standard pharmacological test procedures.

The invention sought to be patented in a principal process aspect resides in the concept of a sequence of reactions including: acylating a 2-(2-hydroxyaminoacetamido)benzophenone to obtain a 2-[2-(N-acyloxyacylamido)acetamido]benzophenone, and cyclizing the product so-obtained in the presence of acid to form a 1,3-dihydro-5-phenyl-2H-1,4-benzodiazepin-2-one.

The invention sought to be patented in a further process aspect resides in the concept of acylating a 2-(2-hydroxyaminoacetamido)benzophenone.

The process of making and the manner of using the invention will now be generally described so as to enable a person skilled in the art of chemistry to make and use the same, as follows:

The new processes of my invention are illustrated schematically for a specific embodiment thereof in FIGURE 1.

The preparation of the starting materials for the processes of my invention, i.e. the 2-(2-hydroxyaminoacetamido)benzophenone which are prepared by treatment of the appropriate 2-(2-haloacetamido)benzophenone with hydroxyl amine is fully described in copending U.S. applications Serial No. 283,966 filed May 29, 1963, Serial No. 283,967 filed May 29, 1963, both now abandoned, Serial No. 301,771 filed August 13, 1963, and Serial No. 301,873 filed August 13, 1963.

Acylation of a 2-(2-hydroxyaminoacetamido)benzophenone in the absence of a cyclizing agent with an excess of acylating agents such as but not limited to acetic anhydride, acetyl chloride, isopropenyl acetate (ketone), ethyl chloroformate, t-butoxy-p-nitrophenyl carbonate, carbo-tert.-butyoxyazide and the like produces 2-[2-(N-acyloxyacylamido)acetamido]benzophenones. The acylation is brought about in the presence or absence of a solvent with an excess of acylating agent and with gentle warming. If a solvent is used it should be one which will not itself react with the acylating agent. When no solvent is used the course of the reaction may be followed by the disappearance of the 2-hydroxyaminoacetamido reactant. Generally the reaction proceeds at a rapid rate but to insure good yields the reaction mixture is allowed to stand for several hours with gentle warming. The temperature at which the reaction occurs should not be so high as to cause decomposition of the desired end product.

Cyclization of the 2-[2-(N-acyloxyacylamido)acetamido]benzophenone is preferably carried out in the presence of a non-oxidizing mineral acid such as hydrochloric acid although any strong acid is suitable. The reactants are suspended or dissolved in a non-reactive solvent for example, ethanol and the mixture brought to boiling for several minutes. On cooling the cyclized product separates out.

It will be apparent to those skilled in the art of organic chemistry that certain of the carbon atoms and the bridging nitrogen atom at the 2-position of the starting benzophenone can be substituted with non-interfering groups instead of hydrogen atoms. Therefore, in the processes of the invention, except for the limitations expressed in this specification, all 2-(2-hydroxyaminoacetamido)phenyl aryl ketones can be employed as starting materials in the process of making aspect of this invention. The acetamido nitrogen can be substituted with hydrogen, an alkyl group such as methyl, ethyl, isopropyl, an alkenyl group such as allyl and methallyl or a lower aralkyl group such as benzyl or phenethyl. The 2-carbon of the acetamido group, i.e., that to which the carbonyl group is-attached, in the 2-hydroxyaminoacetamido compounds can be substituted with hydrogen or with alkyl, aromatic, or aralkyl radicals, including the straight and branched chain alkyl radicals, among which are, for the purpose of illustration but without limiting the generality of the foregoing, mono- or di-alkyl radicals such as methyl, ethyl, propyl, isopropyl, n-butyl, t-butyl, iso-amyl, said di-alkyl radical having two similar or two different alkyl groups and which can be concatenated to form a hydrocarbon ring; the cyclized lower alkyl radicals such as cyclopropyl, cyclobutyl, cyclopentyl; the unsaturated mono- and di-radicals such as vinyl, ethynyl, propenyl; the aromatic radicals such as phenyl or phenyl substituted with non-interfering groups such as halogen, lower-alkyl, hydroxy, etc.; and the aromatic-aliphatic radicals benzyl, or phenethyl, wherein the phenyl group may be similarly substituted or unsubstituted.

The phenyl group bearing the 2-hydroxyaminoacetamido substituent can have one or more substituents other than hydrogen, as for example, but without limitation, lower alkyl, chlorine, bromine trifluoromethyl at the 3-, 4-, 5-, or 6-positions and such substituents do not interfere with the course of the reactions here involved. The phenyl nucleus of the phenyl-keto group can bear one or more simple substituents inert to the reactions herein described, such as lower alkyl, chlorine, bromine, trifluoromethyl, or methyl sulfonyl.

From the disclosure herein illustrating the invention as applied to starting materials which produce compounds wherein the 5-position substituent is phenyl or substituted phenyl, it will be apparent to organic chemists that other mono-cyclic nuclei can be in the starting materials in lieu of phenyl without affecting the course of the reactions involved in the ring closure and the subsequent hydrolysis. Accordingly, such reactions wherein the phenyl group is replaced by 2- or 3-thienyl; 2- or 3-furyl; and 2-, 3- or 4-pyridyl radicals are the full equivalents of the invention as particularly claimed. Moreover instead of an aryl substituent, the phenyl substituent could be replaced by an alkyl substituent, including the straight and branched-chain radicals, among which are for purposes of illustration but without limiting the generality of the foregoing, methyl, ethyl, propyl, isopropyl, n-butyl, t-butyl, iso-amyl, and the cyclized alkyl radicals cyclobutyl, cyclopentyl, and cyclohexyl.

When the starting compounds are substituted as hereinbefore recited, it will be apparent herefrom to those skilled in the art of chemistry that the intermediate compounds and the final products formed by the process of invention will bear, correspondingly, the same substituents, and such substituted compounds are full equivalents for the purposes of the present invention.

The following example illustrates the best mode contemplated by the inventor of using the claimed processes of the invention and of the invention and of the manner of making and using a specific embodiment of the claimed compositions of the invention.

*Example 1*

Warm a mixture of 5-chloro-2-(2-hydroxyaminoacetamido)benzophenone in acetic anhydride on a steam bath until all the solid dissolves (ca. 10 minutes), and cool. Collect the resultant precipitate to obtain 2-[2-(N-acetoxyacetamido)acetamido]-5-chlorobenzophenone, M.P. 151–153° C.

Anal. for $C_{19}H_{17}ClN_2O_5$:

|            | C     | H    | N    | Cl   |
|------------|-------|------|------|------|
| Calculated | 58.70 | 4.41 | 7.41 | 9.12 |
| Found      | 58.68 | 4.42 | 7.11 | 9.1  |

*Example 2*

Suspend 2-[2-(N-acetoxyacetamido)acetamido]-5-chlorobenzophenone in ethyl alcohol containing an excess of hydrochloric acid. Boil the mixture for several minutes until solution occurs and allow to cool. Collect the precipitated 7-chloro-1,3-dihydro-5-phenyl-2H-1,4-benzodiazepin-2-one 4-oxide, M.P. 238–239° C.

The subject matter which the applicant regards as his invention is particularly pointed out and distinctly claimed as follows:

1. The process for preparing 1,3-dihydro-5-phenyl-2H-1,4-benzodiazepin-2-one 4-oxide comprising acylating 2-(2-hydroxyaminoacetamido)benzophenone and cyclizing the 2-[2-(N-acyloxyacylamido)acetamido]benzophenone so-produced in the presence of strong acid.

2. The process of claim 1 wherein the 2-(2-hydroxyaminoacetamido)benzophenone is substituted with chlorine at the 5-position.

No references cited.

HENRY R. JILES, *Acting Primary Examiner.*

ALTON D. ROLLINS, *Assistant Examiner.*